United States Patent
Eichelsheim

[11] 3,853,368
[45] Dec. 10, 1974

[54] HYDRAULIC PISTON-CYLINDER DEVICE HAVING MEANS FOR PERMITTING LIMITED RECIPROCATING MOTION

[75] Inventor: Alexander Victor Eichelsheim, Oldenzaal, Netherlands

[73] Assignee: Allied Power Inc., Milwaukee, Wis.

[22] Filed: Apr. 4, 1973

[21] Appl. No.: 347,926

[52] U.S. Cl............ 296/35 R, 92/DIG. 4, 91/402, 180/89 A
[51] Int. Cl.................... B62d 27/06, B62d 33/06
[58] Field of Search....... 296/28 C, 35 R; 180/89 A; 91/400, 402, 415; 92/DIG. 4

[56] References Cited
UNITED STATES PATENTS

| | | | |
|---|---|---|---|
| 859,629 | 7/1907 | Symons et al................ | 91/402 X |
| 2,112,466 | 3/1938 | Maloon.......................... | 91/400 X |
| 3,642,316 | 2/1972 | Porth et al. .................. | 296/28 C |
| 3,649,066 | 3/1972 | Steiner et al.................. | 296/35 R |

FOREIGN PATENTS OR APPLICATIONS

| | | | |
|---|---|---|---|
| 978,964 | 1/1965 | Great Britain................ | 180/89 A |
| 500,876 | 6/1930 | Germany....................... | 91/415 |

Primary Examiner—Albert J. Makay
Assistant Examiner—Leslie J. Paperner
Attorney, Agent, or Firm—James E. Nilles

[57] ABSTRACT

A double-acting regeneratively controlled piston-cylinder device or tilt cylinder for tilting a spring-supported truck cab relative to the truck chassis to permit access to the truck engine positioned below the cab embodies means therein which enable slight relative reciprocating movement of the piston and cylinder from an "at rest" position in response to slight relative bouncing movement of the cab with respect to the chassis as the truck operates over-the-road. The piston-cylinder device is of the double-acting type and embodies means to provide an oil passage around the piston over part of the piston stroke. The oil passage may take the form of a concentric chamber, an eccentric chamber, a helical groove, or a longitudinal groove, each formed in the cylinder wall or may be a separate tube on the cylinder for by-passing the piston. Relative piston-cylinder motion results because, if the piston is pushed inwardly of the cylinder by cab bounce, oil can escape from the base end of the cylinder via the passage to the rod end of the cylinder. Or, if the piston is pulled outwardly of the cylinder by cab bounce, oil can flow from the rod end of the cylinder via the passage to the base end of the cylinder.

34 Claims, 8 Drawing Figures

3,853,368

HYDRAULIC PISTON-CYLINDER DEVICE HAVING MEANS FOR PERMITTING LIMITED RECIPROCATING MOTION

BACKGROUND OF THE INVENTION

1. Field of Use

This invention relates generally to hydraulic piston-cylinder devices and controls therefor such as are used for adjusting the relative angular position of two pivotally connected parts attached to the piston rod and cylinder, such as a tiltable truck cab pivotally mounted on a truck chassis. In particular, the invention relates to means for such pistoncylinder devices which permit limited relative reciprocating movement between the piston and cylinder in response to corresponding relative movement of the aforesaid parts from an "at rest" position.

2. Description of the Prior Art

Some trucks employ a tiltable driver's cab which is pivotally connected to the truck chassis and tiltable from an "over-the-road" or driving position to a tilted position wherein the truck engine located on the chassis beneath the cab is exposed and accessible. In some cases, a hydraulic piston-cylinder device pivotally connected between the cab and chassis and operable by a hydraulic control system is provided to tilt the cab. Usually, a resilient suspension system (with or without shock absorbers) is provided between the chassis and cab to allow for relative bouncing movement between the cab and chassis and thereby improve the ride as the truck operates over-the-road. The resilient suspension system may, for example, comprise a spring (or other resilient device) mounted on the chassis and on which the cab rests. Thus, the cab is movable or can bounce upwardly or downwardly with respect to the chassis from an "at rest" or intermediate position wherein the cab rest on its springs and there is no load (from cab weight) on the piston-cylinder device. In some instances, the nature of the piston-cylinder device or the hydraulic control system therefor (i.e., such as some regenerative systems) or both, is such that further relative movement between the piston and cylinder in either or both directions from the no load position is blocked once the cab has been returned to its nominal over-the-road position after being tilted. Therefore, in order to permit some limited relative bouncing movement between the cab and chassis during over-the-road operation, it was the practice heretofore to provide the piston-cylinder device with, for example, some type of special lost-motion linkage (usually connected between the piston rod and cab) which allowed for limited pivotal movement of the cab in either direction from nominal position with respect to the chassis, even though the piston and cylinder remained in relatively fixed position with respect to each other.

SUMMARY OF THE PRESENT INVENTION

It is an object of the present invention to provide piston-cylinder devices of the aforesaid type which have means therein to allow for limited relative piston-cylinder movement during over-the-road truck operations, which means are simpler and less costly than the aforementioned lost-motion linkages.

In accordance with the present invention, there are provided two relatively movable pivotally connected parts, such as a truck chassis and a tilt cab pivotally mounted thereon with a resilient suspension system between the cab and chassis; a hydraulically operated piston-cylinder device, preferably of the double acting type, for adjusting the relative angular position of the two parts; and means on said device which enable or permit limited reciprocating movement between the piston and cylinder in response to limited pivotal or angular movement of the parts (cab and chassis) relative to each other in either direction from an at rest position (or positions), as during over-the-road operation of the truck.

In accordance with the invention, the aforesaid means for the piston-cylinder device take the form of an oil passage around the piston over part of the piston stroke i.e., a by-pass passage communicating between the cylinder chambers in front of and behind the piston when the piston is in the zone of its wall, position or positions. The oil passage may take the form of a concentric chamber, an eccentric chamber, a helical groove, or a longitudinal groove, each formed in the cylinder 211l, or a separate tube on the cylinder for by-passing the piston, as hereinafter explained. Normally, the piston is blocked in its at-rest position when the cab is in over-the-rod position. However, in accordance with the invention, the piston is permitted to perform a limited reciprocating movement in the cylinder, through a distance which is equal to that distance through which the by-pass passage extends. Therefore, the hydraulic piston-and-cylinder device according to the invention can adapt itself to the upwardly or downwardly springing or bouncing of the cab during over-the-road truck operation. By means of the passage, oil is displaced directly from the cylinder chamber above the piston to that below the piston and vice versa, and a shortage or surplus, respectively, of hydraulic fluid occurring therewithin, as a consequence of the volume of the piston rod, is accounted for as fluid is sucked in and discharged, respectively, from or to the hydraulic fluid reservoir.

A piston-cylinder device having lost motion means in accordance with the invention is especially well adapted for use or application in a regenerative hydraulic system comprising, for example, in addition to the double-acting piston-cylinder device, a fluid reservoir, a pump, and a directional control valve. In such a system, movement of the tilt cab from 0° to 45° (from over-the-road to overcenter) position is by regenerative pumping; movement of the cab from 45° to 90° (from overcenter to full tilt) position is by regenerative, controlled free fall; movement of the cab from 90° to 45° (from full tilt to overcenter) position is by normal four-way pumping; and movement of the cab from 45° to 0° (from overcenter to over-the-road) position is by controlled free-fall. The nature of such a system is such that it normally prevents relative movement between the piston and cylinder when the cab is in the over-the-road position because of oil entrapment between the cylinder and parts of the pump.

In the regenerative system, at the piston-extend stroke of the pump, the valve setting is such that the same feed pressure prevails in both cylinder chambers (in front of and behind the piston) and, consequently, the resulting force on the piston is equal to the product of the feed pressure and the piston rod cross-sectional area.

With a piston-and-cylinder device controlled in this manner, the by-pass passage has no appreciable influence on the force developed when the piston is extended from the at-rest zone determined by the location of the by-pass passage. When the piston is extended from the at-rest zone in the extension direction, hydraulic fluid is already being supplied to both sides of the piston, so that the effective piston area is equal to the area above-described, regardless of the type of control system employed. Therefore, application of the invention to a regenerative system has the advantage that the effective force applied to the piston when it leaves the rest zone is not changed. In other words, the maximum force which can be developed by the system in the extend direction can be applied directly when the piston is still in the at-rest zone at the moment in which the largest force is wanted as, for example, when tilting a tiltable cab from the over-the-road position.

As hereinbefore mentioned, the by-pass passage in accordance with the invention may be embodied in different forms.

In one simple embodiment, a set of ports are provided in the cylinder wall and spaced apart in the longitudinal direction of piston movement and at the desired lost-motion distance and are connected to each other by a conduit.

In another embodiment, the by-pass passage is obtained by widening the cylinder bore in the desired lost motion zone.

In still another embodiment, a longitudinal groove or helically extending groove is provided in the interior cylinder surface along the desired lost motion zone or distance.

In a more complex embodiment, the piston body is slidably mounted on the piston rod and is movable along the desired lost motion distance between two stops rigidly mounted on the piston rod. The by-pass passage is formed by one or more grooves or channels situated between two or more points adjacent each of the stop positions on the piston rod surface. This latter embodiment has the advantage that no provisions have to be made on the cylinder and that the desired lost motion is obtained in each arbitrary relative position of the piston and the cylinder in which they come to rest and which, in practice, is in the nature of a rest position.

A piston-cylinder device having lost motion means in accordance with the invention is relatively simple in operation, economical to manufacture, reliable in use, and adaptable to various types of hydraulic systems. Other objects and advantages will hereafter appear.

DRAWINGS

Figure 3:
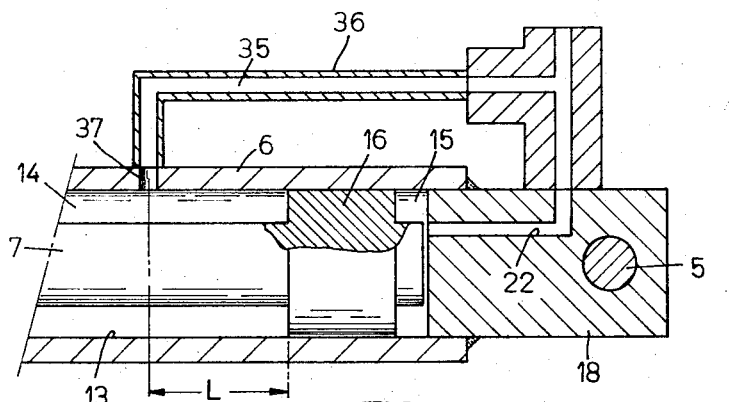
FIG. 3 is an enlarged longitudinal cross section of the lower end of the piston-cylinder device shown in FIG. 2 containing one embodiment of the fluid by-pass passage.
Figure 5:
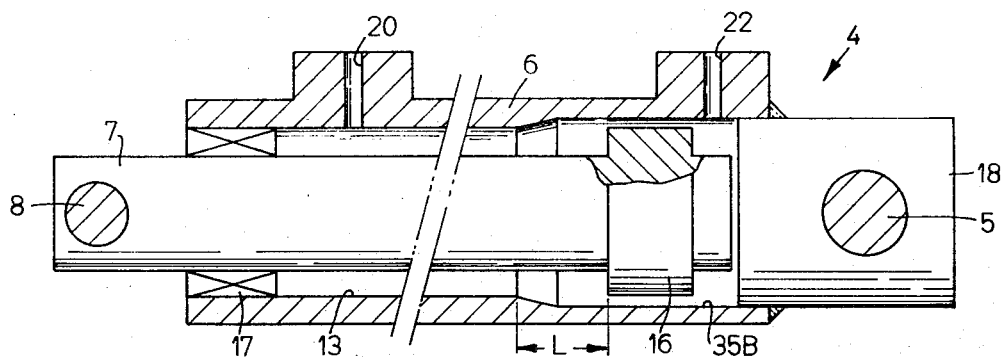
Figure 6:
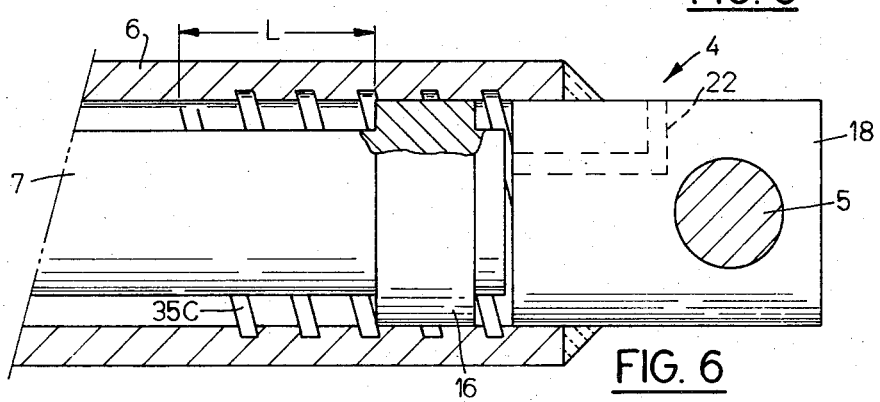
Figure 7:
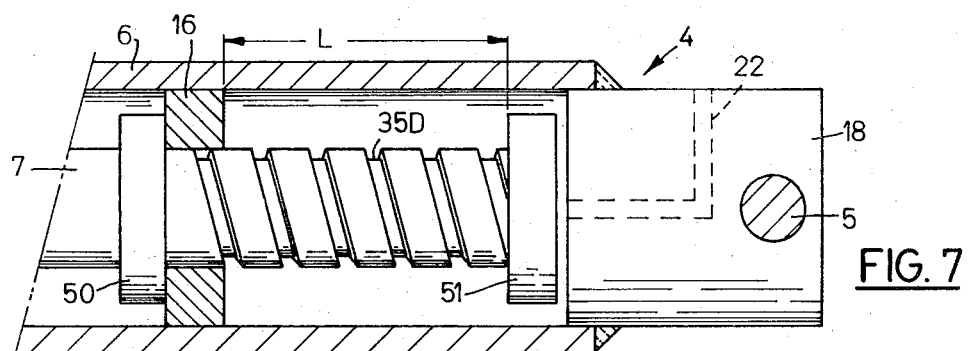
Figure 8:
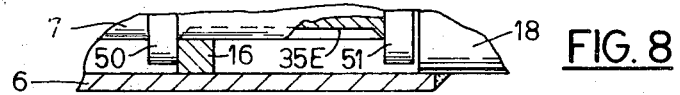

FIGS. 4, 5, 6 and 7 each show an enlarged longitudinal cross section of the lower end of a piston-cylinder device similar to that shown in FIG. 3 and containing a different embodiment of a fluid by-pass passage in accordance with the invention; and FIG. 8 is a modification of FIG. 7.

DESCRIPTION OF PREFERRED EMBODIMENTS

Figure 1:
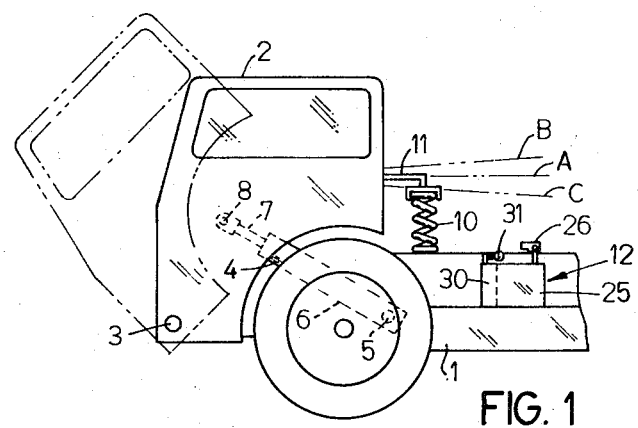
FIG. 1 is a schematic side elevational view of the front end of a truck having a tiltable cab pivotally mounted on the chassis and a piston-cylinder device mounted between the cab and chassis and showing the cab in over-the-road position in full lines and also showing the cab in tilted position in phantom lines.

Referring to FIG. 1, there is shown the front end of a truck comprising a chassis 1 on which a tiltable driver's cab 2 is pivotally mounted by a pin means 3. An extendable and retractable hydraulic type piston-cylinder device 4 is provided between chassis 1 and cab 2 for tilting the cab between its over-the-road position (shown in full lines) and a tilted position (shown in phantom lines). Device 4 comprises a cylinder 6 and a piston rod 7. The lower end of cylinder 6 is pivotally connected by a pin 5 to chassis 1 and the free end of piston rod 7 is pivotally connected by a pin 8 to cab 2.

A resilient suspension system is provided between chassis 1 and cab 2 to provide resilient suspension and comprises, for example, a coiled or helical compression spring 10 mounted on the chassis and an arm 11 rigidly attached to the cab which rests on the top of the coiled or helical compression spring when the cab is in over-the-road position, as shown in full lines in FIG. 1. The arm 11 may be mechanically lockable to spring 10 by suitable locking means (not shown). The suspension system may, if preferred, comprise types of springs other than that shown (such as torsion springs, rubber springs or leaf springs) and, may, if preferred, include shock absorbers (not shown).

Cab 2 has an over-the-road at-rest position indicated by line A in FIG. 1 and is movable by device 4 to and from a full-tilt position, as shown in FIG. 1, or to tilt positions therebetween. Cab 2 is tiltable in response to actuation of device 4 in response to operation of a hydraulic unit 12 which is mounted on chassis 1, as FIG. 1 shows, and which is part of a regenerative type hydraulic control system shown schematically in FIG. 2. Cab 2 is also able to bounce, as hereinafter explained, from the at-rest position indicated by line A in FIG. 1 upwardly and downwardly between, for example, positions indicated by the lines designated B and C, respectively, in FIG. 1.

Figure 2:
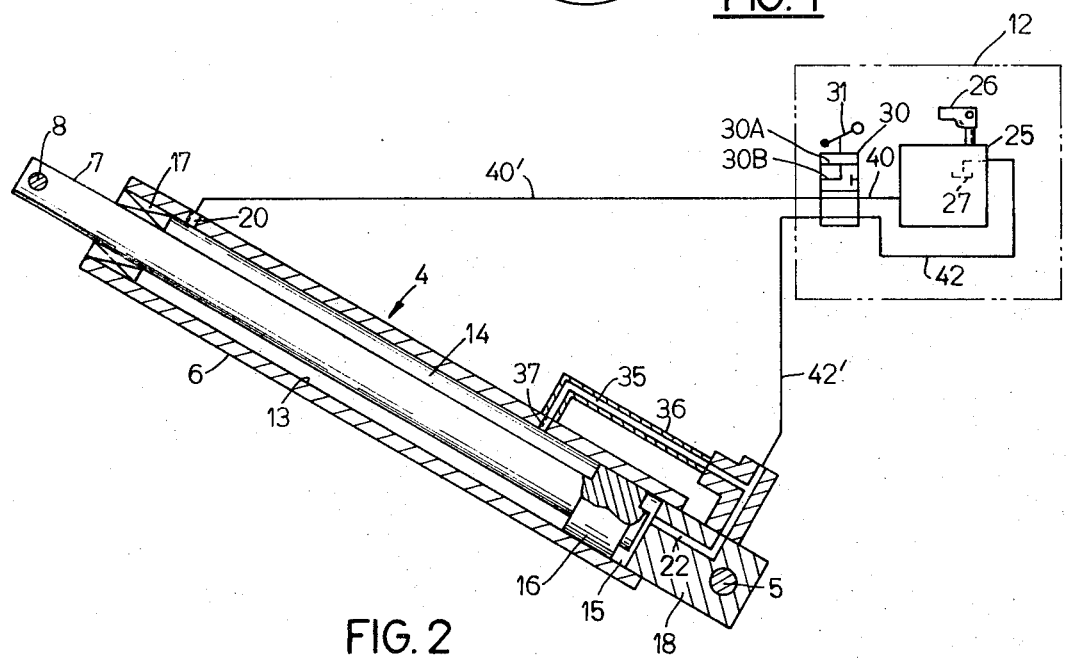
FIG. 2 is a schematic diagram showing the cab tilting piston-cylinder deivce of FIG. 1 in accordance with the invention in enlarged longitudinal cross section and also showing a regenerative type hydraulic control system for the device.

As FIG. 2 shows, piston-cylinder device 4 is of the double acting type and its cylinder 6 comprises a bore 13 therein which is divided into upper and lower cylinder chambers 14 and 15, respectively, by a piston 16 secured to and movable with piston rod 7. A top end seal 17 is provided at the upper end of bore 13 and this seal enables sliding movement of piston rod 7 while preventing fluid flow from the end of the bore. The lower end of bore 13 is sealed by a base member 18 rigidly secured as by welding to cylinder 6. Cylinder 6 is provided with a pull port 20 and with a push port 22 which communicate with cylinder chambers 14 and 15, respectively.

As FIGS. 1 and 2 show, hydraulic unit 12 of the regenerative hydraulic control system comprises a hydraulic fluid pump or pump section 25 manually operable by a pump handle 26, a fluid reservoir or tank section 27, and a two-position control valve 30 manually operable to either position by a handle 31. In accordance with the invention, as hereinafter explained and as shown in FIGS. 2 and 3, piston-cylinder device 4 is provided with hydraulic fluid by-pass means in the form of a by-pass passage 35 provided in a tubular member 36 and communicating between cylinder chambers 14 and 15 through a port 37 in cylinder 6 and push port 22.

In the regenerative control system, fluid conduits 40 and 42 are provided between pump 25 and reservoir 27, respectively, and control valve 30. Fluid conduits 40' and 42' are provided between valve 30 and the ports 20 and 22 for the cylinder chambers 14 and 15, respectively.

When control valve 30 is in the one position shown in FIG. 2, it connects chamber 14 to the pressure side of pump 25 and connects chamber 15 to reservoir 27. Control valve 30 has a second position which connects both chambers 14 and 15 to the pressure side of pump 25 and interrupts communication to reservoir 27.

In FIGS. 2 and 3, piston rod 7 and piston 16 are shown in retracted position which corresponds to the over-the-road at-rest position A (FIG. 1) of cab 2. In this position, piston 16 is adjacent the bottom end of cylinder bore 13. The relative position of piston 16 and cylinder 6 shown in FIGS. 2 and 3 occurs at the end of a retracting movement of piston rod 7 as cab 2 is brought back from a tilted position, as shown in FIG. 1 in phantom, to the over-the-road position shown in full lines in FIG. 1. During this retracting movement, the hydraulic fluid delivered by pump 25 is directed by control valve 30, while it is in the position shown in FIG. 2, to cylinder chamber 14 and hydraulic fluid forced out of cylinder chamber 15 is permitted to flow back to reservoir 27. The end of the retracting movement of piston rod 7 (and thus the position of piston 16 in bore 13) and the end of the tilt-back movement of cab 2 is determined by the movement at which cab 2 comes to rest on spring 10 in position A. The operation of pump 25 is ended at this moment and the control valve 30 is left by the operator in the position shown in FIG. 2.

During over-the-road operation of the truck, cab 2 tends to bounce or spring up and down around its at-rest position A between, for example, positions B and C shown in FIG. 1. However, such cab movement is only possible if piston-cylinder device 4 is able to follow or respond to the cab movement. To obtain this result, device 4 is provided in accordance with the invention with a by-pass passage, such as passage 35 shown in FIGS. 2 and 3, which permits piston 16 (and piston rod 7 attached thereto) to move reciprocably through a distance L (so designated in FIG. 3) in cylinder bore 13 corresponding to the amplitude of the up and down bouncing movement of cab 2. In the embodiment shown in FIGS. 2 and 3, passage 35 connects push port 22 to port 37 in cylinder 6, which latter port is located at the distance L from the bottom of cylinder chamber 10, which distance corresponds to the desired lost motion distance or zone in which piston 16 is reciprocably movable. When cab 2 springs up and down during over-the-road travel of the truck, piston 16 moves freely in the zone defined by the length or distance between the ports 37 and 22 because the quantity of hydraulic fluid driven out from one cylinder chamber 14 or 15 can flow through by-pass passage 35 to the other chamber. Any excess or shortage of hydraulic fluid occurring during such flow is discharged to reservoir 27 or sucked from the reservoir, respectively.

In order to tilt cab 2 forward from its over-the-road position to a tilted position by extending piston rod 7 from cylinder 6, it is necessary that control valve 30 be moved or placed in its other position (i.e., moved from the position shown in FIG. 2). Then, when pump 25 is operated, both cylinder chambers 14 and 15 are supplied or loaded with hydraulic fluid through the passages 30A and 30B in control valve 30 at the supply pressure, so that the force by which piston rod 7 is extended is determined by the product of the supply pressure and the effective piston area, i.e., the cross-sectional area of the piston. It is to be understood that this pressure condition on piston 16 is the same whether piston 16 is in the lost motion zone L or in the remaining upper region of piston travel in cylinder 5. Therefore, the maximum extension force applied by the system to piston 16 is being applied while the piston 16 is still in zone L, as immediately at the start of forward tilting movement of cab 2 when such maximum force is desirable.

FIGS. 4 through 7 show other different embodiments of the invention than that hereinbefore described. FIGS. 4 through 7 each show a portion of piston-cylinder device 4 having a different embodiment of a by-pass passage 35 hereinbefore described. It is to be understood, however, that the devices 4 shown in FIGS. 4 through 7 are double-acting devices and adapted for use with a regenerative control circuit such as shown in FIG. 2. In FIGS. 4 through 7, the by-pass passages 35A, 35B, 35C and 35D, respectively, correspond to passage 35 described in connection with FIGS. 2 and 3. In FIG. 8, an alternative passage 35E is shown which could be used instead of passage 35D in FIG. 7.

Figure 4:
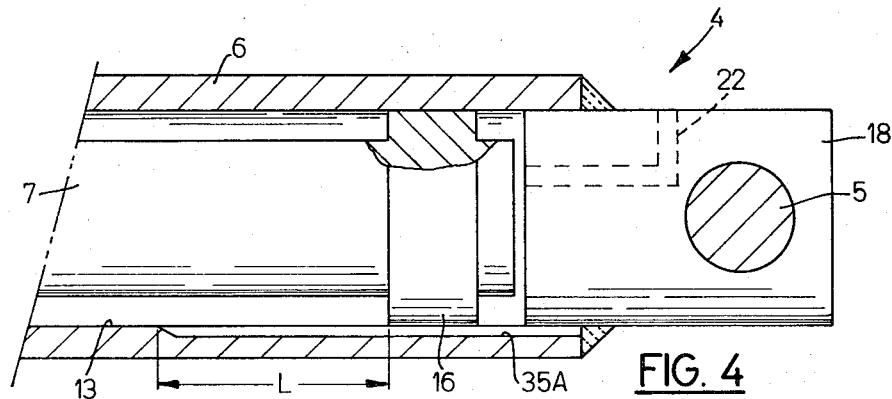

In FIG. 4, passage 35A takes the form of a groove in the wall of cylinder 6. In FIG. 5, passage 35B takes the form of a local widening of the bore 13 of the cylinder 6. In FIG. 6, passage 35C takes the form of a helically extending groove in the wall of cylinder 6.

In the embodiment according to FIG. 7, the piston 16 is slidably mounted on rod 7 and is movable through the lost motion distance L along the piston rod 7 between two collars 50 and 51 rigidly fixed on piston rod 7. The by-pass communication passage is formed in this case by a helical groove 35D (as indicated in FIG. 7 on the piston rod 7) formed in the piston rod surface between the collars 50 and 51 or by a longitudinal groove 35E (as indicated in FIG. 8 on the piston rod 7) extending from collar 50 to collar 51, respectively. The advantage of these latter embodiments is that the lost motion zone L through which piston rod 7 is freely movable relative to piston 16 automatically adjusts to the position in which piston 16 stops at the end of the return tilting movement of cab 2 to its over-the-road or driving position.

It is to be noted that the lost motion means as described herein may be combined without difficulties with the application of special safety valves as described in U.S. Pat. No. 3,472,547, and is likewise advantageously applicable to a device in which the piston-cylinder device, the hydraulic pump and reservoir unit, as well as the control valve when provided, are built together as a unit, as for example, according to Dutch Pat. application No. 7111991.

RESUME

A double-acting regeneratively controlled piston-cylinder device or tilt cylinder 4 for tilting a spring-supported truck cab 2 relative to the truck chassis 1 to permit access to, for example, the truck engine positioned below the cab embodies means therein which enable slight relative reciprocating movement of the piston 16 (and its rod 7) and cylinder 6 from an "at rest" position in response to slight relative bouncing movement of the cab 2 with respect to the chassis 1 as the truck operates over-the-road. The piston-cylinder device 4 is of the double-acting type, comprising fluid ports 20 and 22, and embodies means to provide an oil passage around the piston 16 over part of the piston stroke to define an at-rest zone in which limited relative piston-cylinder motion is possible. The oil passage may take the form, for example, of a concentric chamber 35B (FIG. 5), a helical groove 35C (FIG. 6), or a longitudinal groove 35A (FIG. 4), each formed in the cylinder wall 13 or may be a tube 36 (FIGS. 2 and 3) on the cylinder and having a passage 35 for by-passing the piston 16. Relative piston-cylinder motion results because, if the piston 16 is pushed inwardly of the cylinder 6 by cab bounce, oil can escape from the base end chamber 15 of the cylinder via the passage to the rod end chamber 14 of the cylinder. Or, if the piston is pulled outwardly of the cylinder by cab bounce, oil can flow from the rod end chamber 14 of the cylinder via the passage to the base end chamber 15 of the cylinder.

In a more complex embodiment, the piston 16 is slidably mounted on the piston rod 7 and is movable along the desired lost motion distance between two stops 50 and 51 rigidly mounted on the piston rod. The by-pass passage is formed by one or more grooves or channels 35D or 35E situated between two or more points adjacent each of the stop positions on the piston rod surface. This latter embodiment has the advantage that no provisions have to be made on the cylinder or in the walls thereof and that the desired lost motion is obtained in each arbitrary relative position of the piston 16 and the cylinder 6 in which they come to rest and which, in practice, is in the nature of a rest position.

I claim:

1. In combination: a pair of pivotally interconnected parts movable angularly with respect to each other and having an at-rest position, a hydraulic piston-cylinder device connected to and between said parts for moving them relative to each other and comprising a cylinder having a bore wherein a piston is slidably movable, said piston and cylinder having at least one at-rest position relative to each other corresponding to the at-rest position of said parts; hydraulic means including a pump for supplying hydraulic fluid to said bore on either side of said piston to effect relative movement between said pair of parts, said hydraulic means further comprising a reservoir; and means for permitting limited reciprocating movement between said piston and cylinder in response to relative movement of said parts about their at-rest position, said means comprising passage means affording communication between opposite sides of said piston in a zone which includes said at-rest position of said piston and cylinder, said zone being of a length greater than the axial length of said piston to allow for lost motion movement of said piston in opposite directions, said passage means permitting fluid flow in opposite directions therethrough and said passage means being connected to said reservoir.

2. A combination according to claim 1 wherein said passage means comprises a pair of interconnected ports longitudinally spaced apart from each other with respect to said cylinder and with the spacing between said ports defining the length of said zone.

3. A combination according to claim 2 wherein said ports are provided in said cylinder and communicate with said cylinder bore and are interconnected by a passage located externally of said cylinder bore.

4. A combination according to claim 2 wherein each of said ports takes the form of at least one space between the wall of said cylinder bore and said piston and are interconnected by a passage in the form of a space between the wall of said cylinder bore and said piston.

5. A combination according to claim 4 wherein said passage takes the form of at least one longitudinal groove formed in the bore of said cylinder.

6. A combination according to claim 4 wherein said passage takes the form of annular widening formed in the bore of said cylinder.

7. A combination according to claim 4 wherein said passage takes the form of at least one helical groove formed in the bore of said cylinder.

8. A combination according to claim 2 including a piston rod having a pair of spaced apart stops, said piston being slidably movable on said rod between said stops; and wherein each of said ports is located adjacent a stop and takes the form of a space between said piston rod and said piston.

9. A combination according to claim 8 wherein said ports are interconnected by a passage formed in the surface of said piston rod.

10. A combination according to claim 9 wherein said passage takes the form of at least one longitudinal groove.

11. A combination according to claim 9 wherein said passage takes the form of at least one helical groove.

12. In combination: a pair of pivotally interconnected parts movable angularly with respect to each other and having an at-rest position, said parts being adapted for limited relative movement from said at-rest position, a hydraulic double-acting piston-cylinder device connected to and between said parts for moving them relative to each other and comprising a cylinder having a bore wherein a piston is slidably movable, said piston and cylinder having at least one at-rest position relative to each other corresponding to the at-rest position of said parts; hydraulic means including a pump for supplying hydraulic fluid to said bore on either side of said piston to effect relative movement between said pair of parts and normally preventing relative movement between said piston and cylinder from said at-rest position in response to movement of said parts, said hydraulic means further comprising a reservoir; and means for permitting limited reciprocating movement between said piston and cylinder in response to limited relative movement of said parts about their at-rest position, said means comprising passage means affording communication between opposite sides of said piston in a zone which includes said at-rest position of said piston and cylinder, said passage means comprising a pair of interconnected ports longitudinally spaced apart from each other with respect to said cylinder and with the spacing between said ports defining the length of said zone, said length being greater than axial length of said piston to allow for lost motion movement of said piston in opposite directions, said passage means permitting fluid flow in opposite directions therethrough and said passage means being connected to said reservoir.

13. In a hydraulic piston-cylinder device for use with hydraulic means including a pump and a reservoir: a cylinder having a bore and a piston slidably mounted in said bore, said cylinder having fluid ports on either side of said piston, said piston having at least one at-rest position with respect to said cylinder; and means for permitting limited relative reciprocating movement between said piston and said cylinder about said at-rest position, said means comprising hydraulic fluid passage means affording communication between opposite sides of said piston in a zone which includes said at-rest position of said piston and cylinder, said zone being of a length greater than the axial length of said piston to allow for lost motion movement of said piston in opposite directions, said passage means permitting fluid flow in opposite directions therethrough and said passage means being connectable to said reservoir.

14. A combination according to claim 13 wherein said passage means comprises a pair of interconnected ports longitudinally spaced apart from each other with respect to said cylinder and with the spacing between said ports defining the length of said zone.

15. A combination according to claim 14 wherein said ports are provided in said cylinder and communicate with said cylinder bore and are interconnected by a passage located externally of said cylinder bore.

16. A combination according to claim 14 wherein each of said ports takes the form of at least one space between the wall of said cylinder bore and said piston and are interconnected by a passage in the form of a space between the wall of said cylinder bore and piston.

17. A combination according to claim 16 wherein said passage takes the form of at least one longitudinal groove formed in the bore of said cylinder.

18. A combination according to claim 16 wherein said passage takes the form of an annular widening formed in the bore of said cylinder.

19. A combination according to claim 16 wherein said passage takes the form of at least one helical groove formed in the bore of said cylinder.

20. A combination according to claim 14 including a piston rod having a pair of spaced apart stops, said piston being slidably movable on said rod between said stops; and wherein each of said ports is located adjacent a stop and takes the form of a space between said piston rod and said piston.

21. A combination according to claim 20 wherein said ports are interconnected by a passage formed in the surface of said piston rod.

22. A combination according to claim 21 wherein said passage takes the form of at least one longitudinal groove.

23. A combination according to claim 21 wherein said passage takes the form of at least one helical groove.

24. In a truck having a chassis and a cab pivotably mounted thereon and tiltable angularly between an over-the-road position and a tilted position: a resilient suspension system mounted between said chassis and cab for normally maintaining said cab in an at-rest position with respect to said chassis but permitting limited relative bouncing movement between said cab and chassis; a hydraulic piston-cylinder device pivotally connected to and between said chassis and cab for tilting said cab between its said positions, said device comprising a cylinder having a bore and a piston slidably movable therein, said piston having at least an at-rest position with respect to said cylinder corresponding to the at-rest position of said cab; hydraulic means including a pump for supplying hydraulic fluid to said bore on either side of said piston to effect relative tilting movement between said cab and chassis, said hydraulic means normally preventing relative movement between said piston and cylinder from said at-rest position in response to relative movement between said cab and chassis, said hydraulic means further comprising a reservoir; and means for permitting limited reciprocating movement between said piston and said cylinder in response to relative movement between said cab and said chassis about their at-rest positions, said means comprising passage means affording communication between opposite sides of said piston in a zone which includes said at-rest position of said piston and cylinder, said zone being of a length greater than the axial length of said piston to allow for lost motion movement of said piston in opposite directions, said passage means permitting fluid flow in opposite directions therethrough and said passage means being connected to said reservoir.

25. A combination according to claim 24 wherein said passage means comprises a pair of interconnected ports longitudinally spaced apart from each other with respect to said cylinder and with the spacing between said ports defining the length of said zone.

26. A combination according to claim 25 wherein said ports are provided in said cylinder and communicate with said cylinder bore and are interconnected by a passage located externally of said cylinder bore.

27. A combination according to claim 25 wherein each of said ports takes the form of at least one space between the wall of said cylinder bore and said piston and are interconnected by a passage in the form of a space between the wall of said cylinder bore and said piston.

28. A combination according to claim 27 wherein said passage takes the form of at least one longitudinal groove formed in the bore of said cylinder.

29. A combination according to claim 27 wherein said passage takes the form of an annular widening formed in the bore of said cylinder.

30. A combination according to claim 27 wherein said passage takes the form of at least one helical groove formed in the bore of said cylinder.

31. A combination according to claim 25 including a piston rod having a pair of spaced apart stops, said piston being slidably movable on said rod between said stops; and wherein each of said ports is located adjacent a stop and takes the form of a space between said piston rod and said piston.

32. A combination according to claim 31 wherein said ports are interconnected by a passage formed in the surface of said piston rod.

33. A combination according to claim 32 wherein said passage takes the form of at least one longitudinal groove.

34. A combination according to claim 32 wherein said passage takes the form of at least one helical groove.

* * * * *